United States Patent
Wessendorf

(10) Patent No.: US 10,742,759 B2
(45) Date of Patent: Aug. 11, 2020

(54) WORKFLOW-BASED PUSH NOTIFICATIONS

(71) Applicant: Red Hat, Inc., Raleigh, NC (US)

(72) Inventor: Matthias Wessendorf, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 532 days.

(21) Appl. No.: 14/624,943

(22) Filed: Feb. 18, 2015

(65) Prior Publication Data

US 2016/0241659 A1    Aug. 18, 2016

(51) Int. Cl.
*H04L 29/08* (2006.01)
*H04L 12/18* (2006.01)

(52) U.S. Cl.
CPC .......... *H04L 67/26* (2013.01); *H04L 12/1859* (2013.01); *H04L 67/303* (2013.01)

(58) Field of Classification Search
CPC ...................................................... H04L 29/08
See application file for complete search history.

(56) References Cited

U.S. PATENT DOCUMENTS

| | | | |
|---|---|---|---|
| 7,761,522 B2 | 7/2010 | Shenfield et al. | |
| 8,467,817 B2 | 6/2013 | Said et al. | |
| 8,554,855 B1 * | 10/2013 | Lowry | H04L 67/26 709/206 |
| 8,589,495 B1 | 11/2013 | Beckert | |
| 8,606,923 B2 | 12/2013 | Tekwani | |
| 8,788,944 B1 * | 7/2014 | Gill | G06F 8/61 715/744 |
| 8,910,081 B2 * | 12/2014 | Fennel | H04W 4/50 715/825 |
| 2012/0303774 A1 * | 11/2012 | Wilson | H04L 67/26 709/223 |
| 2013/0084896 A1 * | 4/2013 | Barkie | H04W 12/02 455/466 |
| 2013/0268353 A1 | 10/2013 | Zeto, III et al. | |
| 2014/0279014 A1 | 9/2014 | Roka et al. | |
| 2014/0304620 A1 | 10/2014 | Xu et al. | |

(Continued)

FOREIGN PATENT DOCUMENTS

EP    2890074 A1 *    7/2015    ........... H04L 9/0838

OTHER PUBLICATIONS

"IBM® Mobile Push Notification", http://www-03.ibm.com/software/products/en/mobile-push-notification.

(Continued)

*Primary Examiner* — Tonia L Dollinger
*Assistant Examiner* — Ishrat Rashid
(74) *Attorney, Agent, or Firm* — Lowenstein Sandler LLP

(57) ABSTRACT

Systems and methods for enhancing workflows with data virtualization. An example method may comprise: receiving a token identifying a mobile computing device; executing, by a processing device, a workflow comprising a conditional statement that initiates a request to send a push notification to the mobile computing device; producing, in view of the request, a plurality of messages compliant with a plurality of push notification infrastructures; selecting a message compliant with a push notification infrastructure associated with the mobile computing device; and transmitting the selected message to the push notification infrastructure associated with the mobile computing device.

20 Claims, 4 Drawing Sheets

(56) References Cited

U.S. PATENT DOCUMENTS

2014/0337424 A1* 11/2014 Lee .................... H04L 63/0823
                                                       709/204
2015/0207893 A1*  7/2015 Lee .......................... G06F 9/46
                                                       709/206
2016/0232491 A1*  8/2016 Nalsky ................. G06Q 10/103

OTHER PUBLICATIONS

Independent Report Includes Push Notifications as Part of Its "New Messaging Mandate", PRNewswire, A UBM pic company, http://www.prnewswire.com/newsreleases/independent-report-includespush-notifications-as-part-of-its-newmessaging-mandate-137016618.html, Jan. 10, 2012.

Mobile Engagement Solution: Push Notifications, http://messagesystems.com/sites/default/files/uploads/pdf/messagesystems-product-brief-mobile-pushdata-sheet.pdf, Aug. 2012.

Artisan Gives Mobile Push Messaging a Makeover, http://useartisan.com/news/press/artisan-gives-mobile-push-messagingmakeover/, Jun. 17, 2014.

* cited by examiner

WORKFLOW-BASED PUSH NOTIFICATIONS

TECHNICAL FIELD

The present disclosure is generally related to distributed computer systems, and is more specifically related to distributed computer system employed to process workflow-based push notifications.

BACKGROUND

"Workflow" herein shall refer to a repeatable sequence of actions enabled by an organization of computing resources into a process that transforms materials, provides services, and/or processes information. A workflow may gather information from various sources including end users and may benefit by utilizing an efficient mechanism to notify users of the need for additional information or to inform the users of updated or newly available information.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for a workflow to a send push notifications to multiple mobile computing devices running different mobile computing platforms. (e.g., Android, Apple iOS, Firefox OS).

"Push notification infrastructure" herein shall refer to a distributed computing system that provides push notifications to mobile computing devices. In one example, a push notification infrastructure may be specific to a mobile computing platform (e.g., Apple iOS, Android) and may transmit native push notification messages to the mobile computing devices. "Push notification" herein refers to a form of communication that is initiated by a server and transmits information to a mobile computing device.

"Request" herein shall refer to a communication that initiates a push notification using one or more push notification infrastructures. A request may be a generic request that is not specific to any particular push notification infrastructure.

"Token" herein shall refer to a data item that may identify a mobile computing device or a specific application running on the mobile computing device. A token may identify the combination of the mobile computing device and the application, such that the same application running on different mobile computing devices would associate with different tokens. Token may be represented by a bit string, a unique identifier (e.g., Universally Unique Identifier (UUID)) or other similar data item.

"Message" herein shall refer to a communication that initiates a push notification and may be sent to a push notification infrastructure that is compliant with a mobile computing platform that is supported by one or more target mobile computing devices. The message may comply with the interface of a specific push notification infrastructure and may include text data and one or more tokens that correspond to target mobile computing devices.

In an illustrative example, a workflow may transmit push notifications to mobile computing devices that utilize different underlying push notification mechanisms. The unified push notification component may provide an interface for a workflow that masks the underlying complexity of the various push notification mechanisms. Employing the unified push notification infrastructure may enable the workflow to send push notifications without having to accommodate the technical differences between the push notification mechanisms.

Systems and methods described herein allow a workflow to initiate push notifications to a variety of mobile computing devices that are associated with different mobile platforms, without including multiple customized tasks implementing different device registration and push notification mechanisms. Various aspects of the above referenced methods and systems are described in details herein below by way of examples, rather than by way of limitation.

Figure 1:
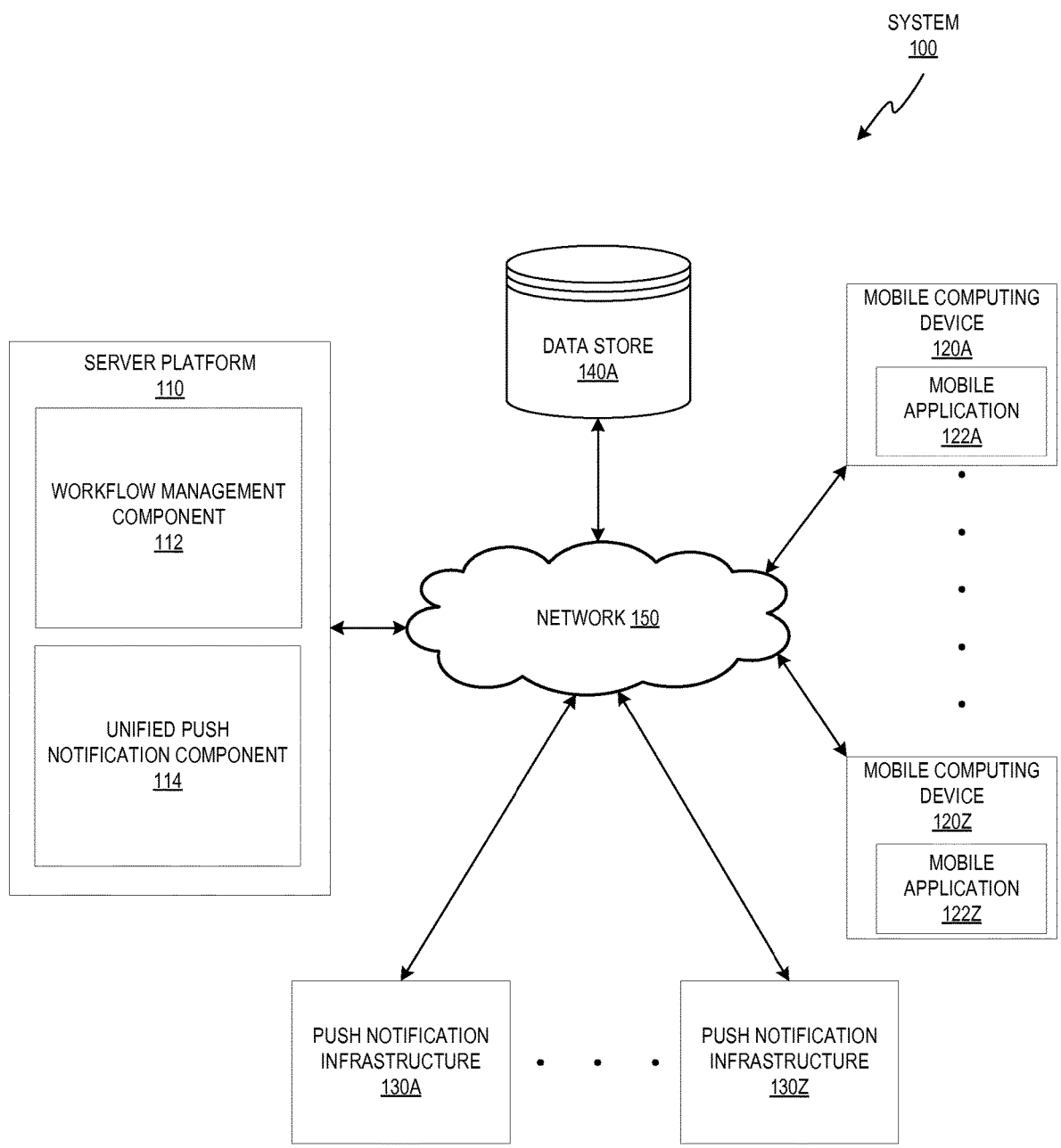
FIG. 1 depicts a high-level diagram of an example system architecture in accordance with one or more aspects of the present disclosure.

FIG. 1 illustrates an example distributed computer system 100, in accordance with an implementation of the disclosure. The system 100 includes a server platform 110, mobile computing devices 120A-Z, push notification infrastructures 130A-Z, and a data store 140, which may be interconnected to one another via a network 150. In one implementation, network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Server platform 110 may include workflow management component 112 and unified push notification component 114, which may interact with one another to execute workflows that transmit notifications to mobile computing devices 120A-Z. Workflow management component 112 may store workflows in data store 140 and may schedule, process, and/or monitor their execution. A workflow may include a sequence of operations (e.g., conditional statements, instructions, comparisons, query commands) that analyze, evaluate, and/or transform data. In one example, a workflow may represent a business process that describes tasks and relationships between the tasks, and may be used to provide a certain service or a product. The workflows may be created or modified by workflow designers and may be executed by one or more computer systems. In one example, a workflow may include one or more commands that may be invoked and interpreted, similar to a script file, and therefore may not need to be compiled in order to be executed.

Unified push notification component 114 may provide workflow management component 112 with the ability to send push notifications to mobile computing devices 120A-Z. Each push notification may be capable of triggering a presentation event on the mobile computing device. A presentation event may be a visual alert or audio alert or some combination of both. A visual alert may include, for example, a popup alert, a banner notification, a mobile application icon badge, or a combination thereof. The push notification may trigger the presentation event for an application irrespective of whether the application is running when the push notification is received. In one example, the push notification may be delivered and displayed by the mobile operating system without changing the state (e.g., running, sleep, closed) of the application. The user may then respond to the push notification and the mobile operating system may awaken or launch the application. In another example, the mobile operating system may wake up the application in response to receiving the push notification and the application may then trigger an alert with or without user interaction.

Unified push notification component 114 may provide workflow management component 112 with an interface to initiate push notifications for a plurality of mobile computing devices that are associated with different push notification infrastructures. The interface may be a unified interface (e.g., unified application programming interface (API)) that enables a workflow to transmit messages to mobile computing devices without requiring the workflow to include logic that would be dependent on the attributes, parameters, and/or interfaces associated with the mobile computing platform running on the mobile computing device.

Mobile computing devices 120A-Z may include a variety of different mobile computing device types. The different mobile computing device types may include, for example, a mobile phone, a tablet, a personal digital assistant (PDA), a laptop, or other similar mobile computing device. The mobile computing devices may include features of a desktop computer with other features, such as a display, touch interface, Wi-Fi, Bluetooth, cellular, GPS navigation, camera, voice recorder, music player, near field communication or other similar features.

Mobile computing devices 120A-Z may be based on different computing platforms. A computing platform may be based on a hardware architecture and a software platform. The hardware architecture may include the type of central processing unit (e.g., processor), such as ARM, NVidia, Intel, AMD, or other similar processing device. The software platform may include a mobile operating system, such as for example, Apple iOS®, Android®, Firefox OS®, Windows Phone®, BlackBerry® or other similar operating system. Variants of a mobile computing platform may utilize the mobile computing platform but may have different system resources such as different display size, processing power or memory capacity.

Mobile applications 122A-Z may run on mobile computing devices 120A-Z and may also include variants and sub-variants. A variant of a mobile application may be a version of a mobile application that supports a specific mobile computing platform variant. A mobile application sub variant may be a version of the mobile application that supports a sub variant of mobile computing platform (e.g., smartphone, tablet, and laptop). In some situations, a variant of a mobile application may be configured to operate on all sub-variants of the mobile computing platform and therefore there may be no need to have a sub-variant of the mobile application, in other situations the mobile application variant may not be configured to accommodate all of the sub-variants of the mobile computing platform and there may be a sub variant of the mobile application to accommodate different or additional features provided by the mobile computing platform sub variant.

Push notification infrastructures 130A-Z may include a system (e.g., a server or a group of servers) that may provide push notifications to mobile computing devices 120A-Z. Each of the push notification infrastructures 130A-Z may be specific to one or more mobile computing platforms. In one example, a push notification infrastructure may be a native push notification infrastructure that is specific to a mobile computing platform (e.g., Apple iOS, Android) and may transmit native notification messages to mobile computing devices 120A-Z. Push notification infrastructures 130A-Z may also provide push notifications to other computing devices by sending push notifications to web browsers or native applications running on the computing devices. This may enable push notifications to be sent to devises other than mobile devices, such as desktop or a server device.

Figure 2:
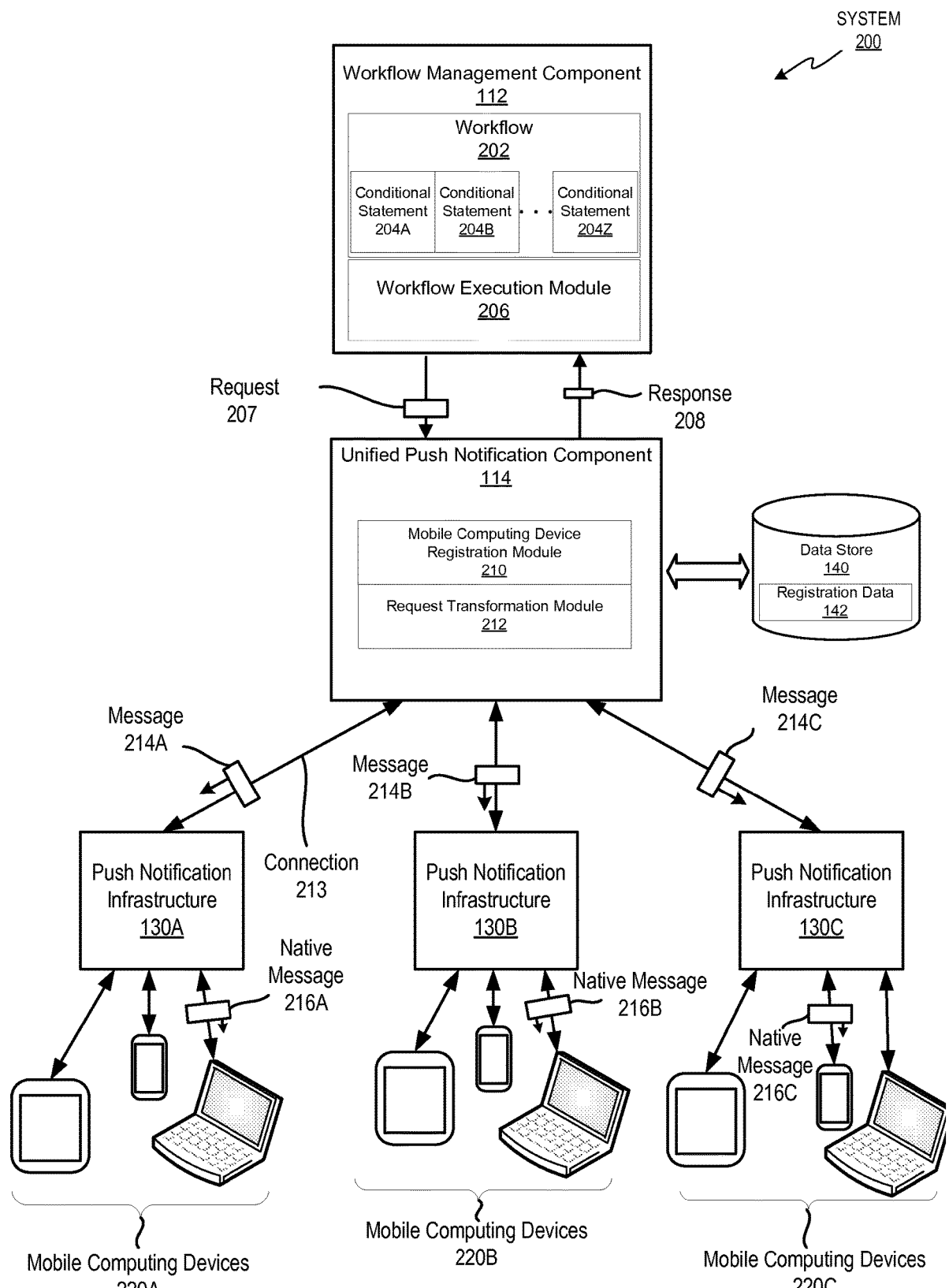
FIG. 2 depicts a block diagram of an illustrative embodiment of a workflow management component and a unified push notification component in accordance with one or more aspects of the present disclosure.

FIG. 2 depicts a block diagram of an exemplary system 200 that includes workflow management component 112, unified push notification component 114, push notification infrastructures 130A-C and illustrates interactions between one another (e.g., request 207 and messages 214A, native message 216A), in accordance with one or more aspects of the present disclosure. Workflow management component 112 may include a workflow 202 with conditional statements 204A-Z and an execution engine module 206.

Unified push notification component 114 may include a mobile application registration module 210 and a request transformation module 212, which may be communicably coupled to data store 140 and push notification infrastructures 130A-C. More or less components or modules may be included, for example, two or more of the modules may be combined into a single module, or one of the modules may be divided into two or more modules. In one implementation, one or more of the modules may reside on different computing devices (e.g., different server computers, on a single client device, distributed among multiple client devices, etc.).

Workflow management component 112 may store, plan, schedule, process and/or monitor the execution of workflow 202. Workflow 202 may include a sequence of operations that when executed retrieve, analyze, evaluate and transform data (e.g., internal or external information). The sequence of operations may include conditional statements 204A-Z, which may include statements (e.g., if-then or if-then-else statements) that determine when a condition occurs and may indicate a corresponding action (e.g., operation). The conditional statement may have one or more operators and one or more operands. The operators may include logical connectors such as equals (=), greater than (>), less than (<), or other similar operator. The operands may include variables that correspond to data, such as data received from one or more data sources. The conditional statement may be represented visually as shapes or as text or some combination of both.

Workflow execution module 206 may provide a runtime environment for the workflow and may include mechanisms to interpret and execute the conditional statements. The mechanisms may analyze a portion of the conditional statement and determine whether a push notification should be initiated. To initiate a push notification, workflow execution module 206 may access a corresponding rule or set of rules, which may be used to generate request 207.

Request 207 may be a communication that initiates push notifications that span separate push notification infrastructures. Request 207 may include entity identification data, textual notification data and security information (e.g., a secret). The entity identification data may identify a specific user or a group of users that correspond to one or more mobile computing devices. In one example, the entity identification data may include one or more aliases for one or more users or groups. The textual notification data may include a textual message, such as a string of characters, which may be included as payload in a native message received by the mobile computing device. The security information may be a secret passcode or key that includes a text string and may be provided by the workflow to the unified push notification component to allow (e.g., authorize) the workflow to send push notifications. In one example, the secret may correspond one-to-one with the mobile application.

Unified push notification component 114 may receive and analyze request 207 and may transmit messages 214A-C over connection 213 to one or more push notifications infrastructures 130B. Connection 213 may be a long-term connection that persists beyond connection failures or system restarts (e.g., reboot). In one example, the persistent connection may utilize keep-alive signals to monitor the connection. The Keep-alive signals may be sent at predefined intervals (e.g., every second) and may invoke a reply. If no reply is received, the connection may be recreated, similar to HTTP persistent connections.

In one example, unified push notification component 114 may receive a request 207, which may be a generic request that is not specific to any one push notification infrastructure. In response, unified push notification 114 may generate multiple messages 214A-C, which may represent native requests corresponding to the respective native push notification infrastructures.

As shown in FIG. 2, unified push notification component 114 may include a mobile computing device registration module 210 and a request transformation module 212 and may be communicable coupled to data store 140.

Mobile computing device registration module 210 may receive a communication from a mobile computing device and may register the mobile computing device to receive subsequent push notifications. In one example, a mobile application running on the mobile computing device may transmit identification information (e.g., token) to the mobile computing device registration module 210 which may be included within registration data 142 and stored in data store 140.

Data store 140 may store information related to the mobile computing device and related to the applications installed on the mobile computing device. In one example, the data store may include one or more hierarchical data structures. A hierarchical data structure may include a root node and one or more child-nodes, which may be arranged as a logical tree structure. Each hierarchical data structure may correspond to a specific mobile application and the child nodes may correspond to variants or sub variants of the mobile application. In one example, the root node may correspond to a mobile application and the child nodes may correspond to variants of the mobile application. A first child node may correspond to a variant of the mobile application that runs on Apple iOS and a second child node may correspond to a variant that runs on Android. Each variant may in turn include three sub-variants of the mobile application that supports mobile phones, tablets and laptops respectively.

Request transformation module 212 may receive request 207 from workflow management component 112 and may transform the request 207 into multiple messages 214A-C that comply with each of the push notification infrastructures 130A-C. Request transformation module 212 may transmit messages 214A-C utilizing an interface provided by the push notification infrastructure, for example the interface may include a web based application programming interface (API). Messages 214A-C may be messages formatted to comply with the interface of the push notification infrastructure, and may include for example, a token, a payload and security information (e.g., a shared secret).

Each of the push notification infrastructures 130A-C may be associated with a specific mobile computing platform. In one example, each push of the notification infrastructures 130A-C may be designed, implemented, run, or hosted by a separate entity. Each of the push notification infrastructures 130A-C may utilize its own native message 216A-Z to communicate to a respective mobile computing device. In another example, the push notification infrastructures 130A-C may be a push notification infrastructure that mimics or replaces one or more of the native push notification infrastructures. Push notification infrastructures 130A-C may utilize any type of network connection to communicate with its respective mobile devices. In one example it may utilize an connection similar to connection 213 (e.g., HTTP connection) however in other examples it may use a different communication protocol such as extensible messaging and presence protocol (XMPP). XMPP may be a communication protocol for message-oriented services and may be based on an Extensible Markup Language (XML).

In one example, push notification infrastructures 130A-C may correspond respectively to Apple Push Notification Service (APNs), Google Cloud Messaging (GCM) Service and Mozilla SimplePush. Apple Push Notification Service may provide push notifications to mobile computing devices 220A running the Apple based mobile computing platform (e.g., iOS). Google Cloud Messaging formally known as the Android Cloud to Device Messaging (C2DM) may provide push notifications to mobile computing devices 220B running a Google based mobile computing platform (e.g., Android or Chromecast). SimplePush may provide push notifications to mobile computing devices 220C running a Mozilla based mobile computing platform (e.g., Firefox OS). Push notification infrastructures may also include push notifications services from other providers, such as for example, Microsoft Push Notification Service (MPNS), Windows Push Notification Services (WNS) or Blackberry push service.

Figure 3:
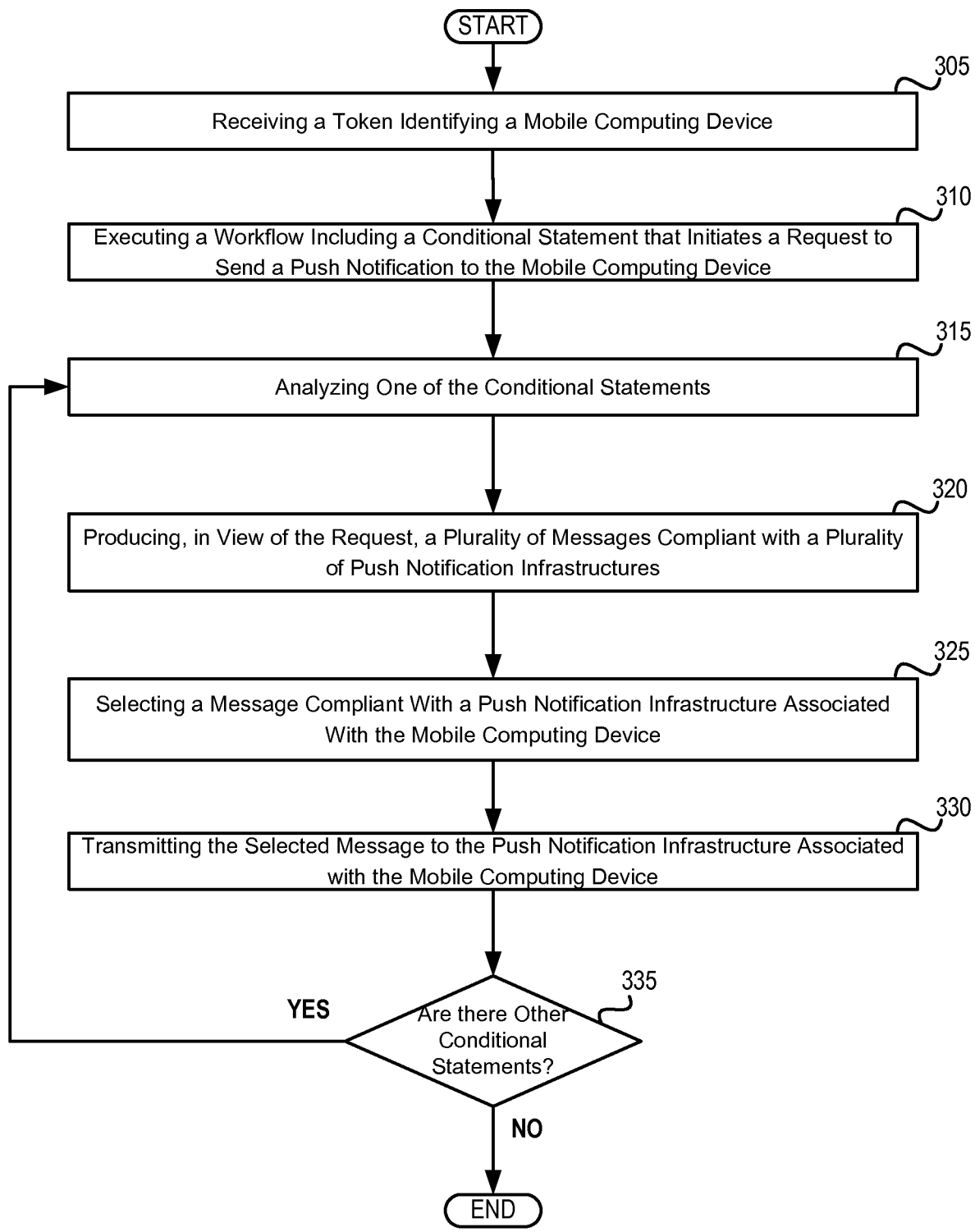
FIG. 3 depicts a flow diagram of an example method for a workflow management component to utilize a unified push notification to enhance the execution of a workflow in accordance with one or more aspects of the present disclosure.

FIG. 3 depicts a flow diagram of one illustrative example of a method 300 for processing a workflow that utilizes a unified push notification component. Method 300 may be performed by processing device that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. Method 300 may be performed by processing device of a client device or a server device and may begin at block 305.

At block 305, the processing device may receive a token identifying a mobile computing device. In one example, unified push notification component 114 may receive the token from a mobile computing device over a network connection (e.g., http connection, XMPP connection). The token may be a data item that is used to identify a mobile computing device or a specific application running on the mobile computing device. The token may be unique to the combination of the mobile computing device and the application, such that the same application running on different mobile computing device may have a different token. In one example, the token may include a unique identifier, such as a Universal Unique Identifier (UUID), and may be generated and/or stored within the push notification infrastructure.

The token may be generated by the push notification infrastructure, the mobile application, the mobile operating system, or some combination thereof. In one example, the mobile application may initiate a token creation operation with the mobile operating system and the mobile operating system may subsequently communicate with its corresponding push notification infrastructure. The push notification infrastructure (e.g., a push server) may create a token in response to the communication or may fetch a token from a pool of previously generated tokens and may transmit the token to the mobile application. In another example, the token may be generated by the mobile computing device's operating system based on information provided by the push notification server and/or mobile application. In yet another example, the mobile application or mobile operating system may provide information to the push notification server to seed the generation of the token.

Once the token is generated, the mobile application may transmit the token to the unified application server for registration (e.g., mobile computing device registration). Registration may include adding the token to the data store and associating (e.g., indexing) the token with entity identification information (e.g., user ID or group ID) in such a manner that allows the universal push notification component to lookup the token in response to a request from the workflow management component.

At block 310, the processing device may execute a workflow that includes a conditional statement that initiates a request to send a push notification to the mobile computing device. The conditional statement may include multiple operators and operands organized in, for example, an if-then statement (e.g., if-then-else) that indicates the performance of an action (e.g., operation) when a condition occurs.

At block 315, the processing device may analyze the conditional statement. Analyzing the conditional statement may involve parsing the operators and operands and identifying whether a push notification is appropriate. The conditional statement may initiate a request, which may result in the transmission of multiple push notifications to multiple mobile computing devices running different mobile computing platforms.

At block 320, the processing device may produce, based on the request, multiple messages compliant with the multiple push notification infrastructures. The request may be a communication from the workflow management module to the unified push notification component and may include information for identifying a mobile computing device. The information within the request may include a user ID, a group ID, a mobile application ID, a variant ID, a sub-variant ID or a combination thereof. In one example, the information included within the request may not identify the mobile computing device but may be used by the unified push notification component to identify information (e.g., tokens) associated with the mobile computing devices. For example, the information within the request may function as a key or index value for looking up information in a table, map or other similar data structure. The unified push notification server may then group the tokens based on whether the tokens are associated with a common mobile computing platform variant. For example, multiple tokens that are associated with a variant (e.g., child node of the data structure) may be grouped into a message and multiple tokens associated with another variant (e.g., another child node) may be grouped into a second message and so on.

This information may then be used by the unified push notification server to locate within the data store one or more tokens that correspond to each mobile computing device. Each message may be formatted to comply with push notification infrastructure that supports the variant. In one example, the push notification infrastructures may support a first mobile computing platform (e.g., Apple iOS) and a different push notification infrastructure may support a second mobile computing platform (e.g., Android operating system).

Producing messages compliant with the push notification infrastructures may involve formatting each message based on the interface of the respective push notification infrastructure. The interface of the push notification infrastructure may indicate how the message should be transmitted (e.g., protocol), the destination of the message (e.g., server IP address) and the message format. In one example, a message may include multiple tokens and a payload, which may indicate the type of presentation event, as well as any text or audio to be included as a part of the presentation event.

At block 325, the processing device may select a message compliant with the respective push notification infrastructure associated with a target mobile computing device. In one example, the unified push notification component may select one or more messages that are compliant with the interface of the push notification infrastructures and transmit them. It may also select one or more messages that are compliant with another push notification infrastructure and subsequently process them. The order in which the messages are selected may be based on an optimization algorithm that maximizes message throughput and/or quality of service.

At block 330, the processing device may transmit the selected message to the push notification infrastructure associated with the mobile computing device. The selected message may be transmitted to a server within the push notification infrastructure using a connection specific to the respective push notification infrastructure. In one example, the push notification infrastructure may respond with a response message that indicates whether the tokens within the selected message are valid tokens (e.g., outdated). In response, the unified notification component may update the tokens in the data store to remove invalid tokens.

At block 335, the processing device may determine whether there are other conditional statements. When there are the method may branch back to block 310 to analyze the other conditional statements. When there are no more conditional statements the method may end.

Responsive to completing the operations described herein above with references to block 335, the method may terminate.

Figure 4:
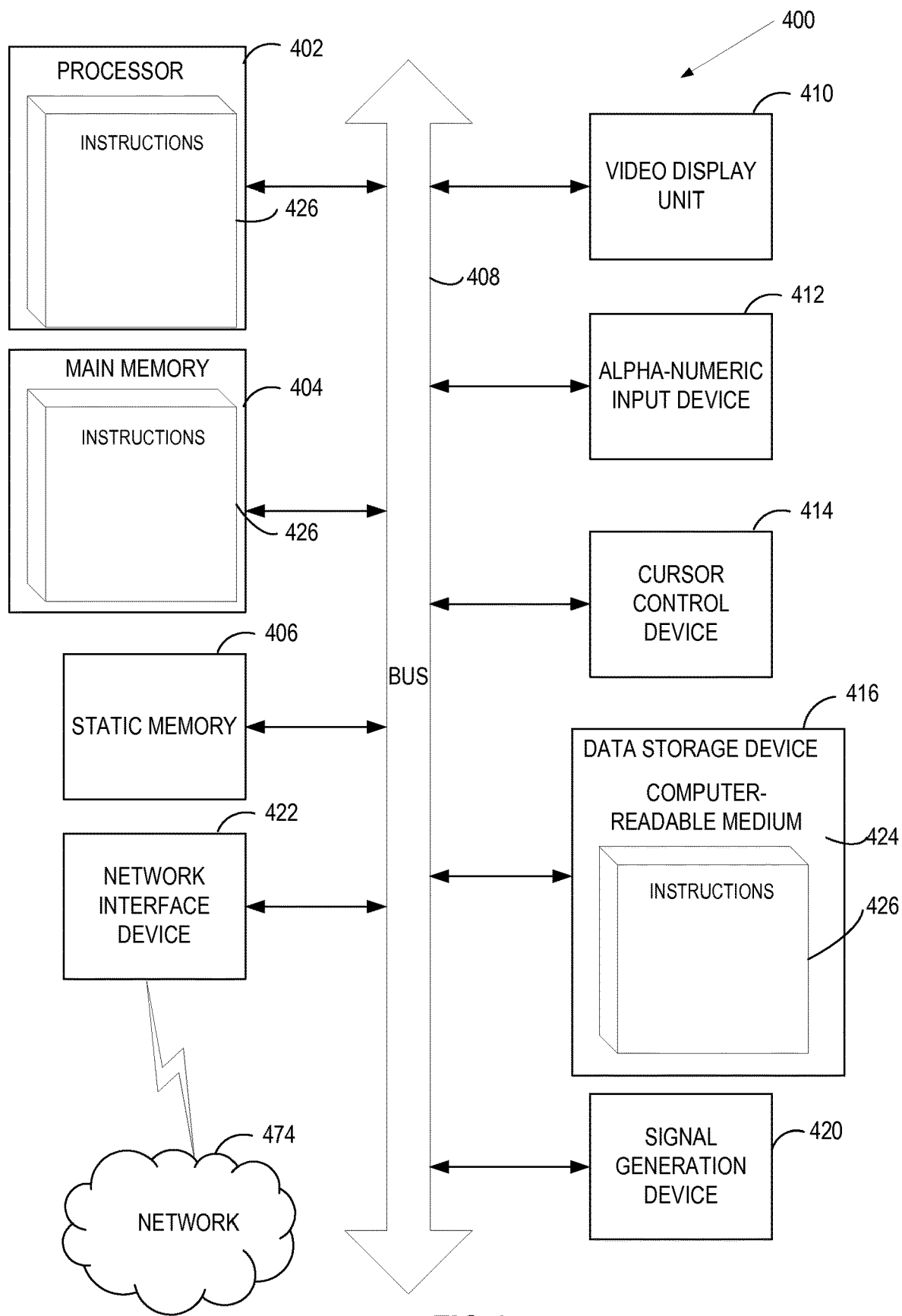
FIG. 4 depicts a block diagram of a computer system operating in accordance with one or more aspects of the present disclosure.

FIG. 4 depicts a block diagram of a computer system operating in accordance with one or more aspects of the present disclosure. In various illustrative examples, computer system 400 may correspond to example system architecture 100 of FIG. 1.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processor 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processor 402 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alpha-numeric input device 412 (e.g., a keyboard), and a cursor control device 414 (e.g., a mouse).

Data storage device 416 may include a non-transitory computer-readable storage medium 424 on which may store instructions 426 encoding any one or more of the methods or functions described herein, including instructions encoding workflow management component 112 or unified push notification component 114 of FIG. 1 implementing method 300.

Instructions 426 may also reside, completely or partially, within main memory 404 and/or within processor 402 during execution thereof by computer system 400, hence, main memory 404 and processor 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

executing, by a processing device, a workflow comprising a conditional statement, entity identification data, and security information, wherein the entity identification data identifies a group of users and the security information authorizes a workflow engine to initiate push notifications to the group of users;

generating, in view of the conditional statement of the workflow, a request that comprises the security information, wherein the request comprises a single request to initiate a push notification to a plurality of computing devices of the group of users;

identifying a plurality of tokens corresponding to the plurality of computing devices of the group of users;

accessing a hierarchical data structure comprising a plurality of nodes representing computing platform variants of the plurality of computing devices;

grouping the plurality of tokens in view of the hierarchical data structure into a first group and a second group, wherein the first group comprises tokens associated with a first computing platform variant of the hierarchical data structure and the second group comprises tokens associated with a second computing platform variant of the hierarchical data structure;

producing a plurality of messages compliant with a plurality of push notification infrastructures, wherein a first message of the plurality messages comprises the first group of tokens and wherein the second message of the plurality of messages comprises the second group of tokens; and transmitting the first message to a first push notification infrastructure associated with the first computing platform variant and the second message to a second push notification infrastructure associated with the second computing platform variant.

2. The method of claim 1, wherein the first message comprises the first group of tokens, a message text, and an identifier of a mobile application.

3. The method of claim 1, wherein the first push notification infrastructure supports a first mobile computing platform and the second push notification infrastructure supports a second mobile computing platform, wherein the first mobile computing platform comprises Apple® iOS® and the second mobile computing platform comprises Android® Operating System.

4. The method of claim 2, wherein each token of the first group of tokens identifies at least one of: a mobile computing device or an application running on the mobile computing device.

5. The method of claim 1, wherein at least one of the push notifications is presented by at least one of: an alert message or an icon badge on a mobile application.

6. The method of claim 1, wherein the security information comprises a password that authorizes the workflow engine to initiate the single request that causes a plurality of push notifications to be sent to a plurality of mobile computing devices running different mobile computing platforms.

7. The method of claim 2, further comprising:
registering a computing device of the plurality of computing devices; and
storing a token for the computing device in a data store.

8. A non-transitory machine-readable storage medium storing instructions that cause a processing device to:
execute a workflow comprising a conditional statement, entity identification data, and security information, wherein the entity identification data identifies a group of users and the security information authorizes a workflow engine to initiate push notifications to the group of users;
generate, in view of the conditional statement of the workflow, a request that comprises the security information, wherein the request comprises a single request to initiate a push notification to a plurality of computing devices of the group of users;
identify a plurality of tokens corresponding to the plurality of computing devices of the group of users;
access a hierarchical data structure comprising a plurality of nodes representing computing platform variants of the plurality of computing devices;
group the plurality of tokens in view of the hierarchical data structure into a first group and a second group, wherein the first group comprises tokens associated with a first computing platform variant of the hierarchical data structure and the second group comprises tokens associated with a second computing platform variant of the hierarchical data structure;
produce a plurality of messages compliant with a plurality of push notification infrastructures, wherein a first message of the plurality of messages comprises the first group of tokens and wherein the second message of the plurality of messages comprises the second group of tokens; and
transmit the first message to a first push notification infrastructure associated with the first computing platform variant and the second message to a second push notification infrastructure associated with the second computing platform variant.

9. The non-transitory machine-readable storage medium of claim 8, wherein the first message comprises the first group of tokens, a message text, and an identifier of a mobile application.

10. The non-transitory machine-readable storage medium of claim 8, wherein the first push notification infrastructure supports a first mobile computing platform and the second push notification infrastructure supports a second mobile computing platform, wherein the first mobile computing platform comprises Apple® iOS® and the second mobile computing platform comprises Android® Operating System.

11. The non-transitory machine-readable storage medium of claim 9, wherein each token of the first group of tokens identifies at least one of: a mobile computing device or an application running on the mobile computing device.

12. The non-transitory machine-readable storage medium of claim 8, wherein at least one of the push notifications is presented by at least one of: an alert message or an icon badge on a mobile application.

13. The non-transitory machine-readable storage medium of claim 8, wherein the security information comprises a password that authorizes the workflow engine to initiate the single request that causes a plurality of push notifications to be sent to a plurality of mobile computing devices running different mobile computing platforms.

14. The non-transitory machine-readable storage medium of claim 9, wherein the processing device further to:
register a computing device of the plurality of computing devices; and
store a token for the computing device in a data store.

15. A system comprising:
a memory; and
a processing device operatively coupled to the memory, the processing device to:
execute a workflow comprising a conditional statement, entity identification data, and security information, wherein the entity identification data identifies a group of users and the security information authorizes a workflow engine to initiate push notifications to the group of users;
generate, in view of the conditional statement of the workflow, a request that comprises the security information, wherein the request comprises a single request to initiate a push notification to a plurality of computing devices of the group of users;
identify a plurality of tokens corresponding to the plurality of computing devices of the group of users;
access a hierarchical data structure comprising a plurality of nodes representing computing platform variants of the plurality of computing devices;
group the plurality of tokens in view of the hierarchical data structure into a first group and a second group, wherein the first group comprises tokens associated with a first computing platform variant of the hierarchical data structure and the second group comprises tokens associated with a second computing platform variant of the hierarchical data structure;
produce a plurality of messages compliant with a plurality of push notification infrastructures, wherein a first message of the plurality messages comprises the first group of tokens and wherein the second message of the plurality of messages comprises the second group of tokens; and transmit the first message to a first push notification infrastructure associated with the first computing platform variant and the second message to a second push notification infrastructure associated with the second computing platform variant.

16. The system of claim 15, wherein the first message comprises the first group of tokens, a message text, and an identifier of a mobile application.

17. The system of claim 15, wherein the first push notification infrastructure supports a first mobile computing platform and the second push notification infrastructure supports a second mobile computing platform, wherein the first mobile computing platform comprises Apple® iOS® and the second mobile computing platform comprises Android® Operating System.

18. The system of claim 16, wherein each token of the plurality of tokens identifies at least one of: a mobile computing device or an application running on the mobile computing device.

19. The system of claim 15, wherein at least one of the push notifications is presented by at least one of: an alert message or an icon badge on a mobile application.

20. The system of claim 15, wherein the security information comprises a password that authorizes the workflow engine to initiate the single request that causes a plurality of push notifications to be sent to a plurality of mobile computing devices running different mobile computing platforms.

* * * * *